(12) United States Patent
Gunasekaran

(10) Patent No.: US 12,546,474 B2
(45) Date of Patent: Feb. 10, 2026

(54) NOZZLE BODY FOR FUEL INJECTOR

(71) Applicant: ROLLS-ROYCE plc, London (GB)

(72) Inventor: Barani P. Gunasekaran, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 19/092,052

(22) Filed: Mar. 27, 2025

(65) Prior Publication Data

US 2025/0321004 A1  Oct. 16, 2025

(30) Foreign Application Priority Data

Apr. 15, 2024  (GB) ..................................... 2405296

(51) Int. Cl.
*F23R 3/14*  (2006.01)
*F23R 3/28*  (2006.01)
*F23R 3/30*  (2006.01)
*F02C 7/22*  (2006.01)

(52) U.S. Cl.
CPC ................ *F23R 3/14* (2013.01); *F23R 3/286* (2013.01); *F23R 3/30* (2013.01); *F02C 7/22* (2013.01)

(58) Field of Classification Search
CPC .... F23R 3/14; F23R 3/28; F23R 3/283; F23R 3/286; F23R 3/30; F23R 3/32; F23R 3/34; F23R 3/343; F23R 3/346
See application file for complete search history.

(56) References Cited

U.S. PATENT DOCUMENTS

| | | |
|---|---|---|
| 5,737,921 A | 4/1998 | Jones et al. |
| 6,547,163 B1* | 4/2003 | Mansour ............... B05B 1/3421 239/404 |
| 8,096,135 B2 | 1/2012 | Caples |
| 8,365,531 B2* | 2/2013 | Pidcock ................ F23D 11/107 60/737 |
| 10,808,623 B2* | 10/2020 | Staufer .................... F02C 9/263 |
| 10,955,138 B2 | 3/2021 | Wirtz et al. |
| 11,131,460 B2* | 9/2021 | Muldal .................. F23D 11/107 |
| 11,280,493 B2* | 3/2022 | Tentorio .................... F23R 3/30 |
| 11,408,346 B2* | 8/2022 | Matsuyama ............ F23R 3/343 |
| 2009/0173076 A1* | 7/2009 | Toon ....................... F23R 3/343 60/746 |

(Continued)

FOREIGN PATENT DOCUMENTS

| | | |
|---|---|---|
| EP | 2302300 A2 | 3/2011 |
| GB | 2592254 A | 8/2021 |

OTHER PUBLICATIONS

European Search report dated Jun. 13, 2025, issued in EP Patent Application No. 25164020.7.

(Continued)

*Primary Examiner* — William H Rodriguez

(57) ABSTRACT

A nozzle body for a fuel injector includes an outer air circuit, a fuel circuit, a dome air circuit, and a first prefilmer radially disposed between the outer air circuit and the dome air circuit. The first prefilmer is inclined to a central axis of the nozzle body by an inclination angle from 0 degree to 10 degrees, such that a fuel discharged by the fuel circuit at least partially impinges on the first prefilmer. An axial gap between a shroud throat of a shroud of the nozzle body and a trailing edge of the first prefilmer is between 1 mm and 2 mm, such that the fuel impinging on the first prefilmer is guided towards a dome air discharged by the dome air circuit.

17 Claims, 4 Drawing Sheets

(56) References Cited

U.S. PATENT DOCUMENTS

| | | | |
|---|---|---|---|
| 2010/0050644 A1* | 3/2010 | Pidcock | F23R 3/343 60/737 |
| 2011/0271680 A1* | 11/2011 | Bagchi | F23R 3/28 60/737 |
| 2014/0360202 A1* | 12/2014 | Toon | F23R 3/343 60/776 |
| 2015/0159874 A1* | 6/2015 | Toon | F23R 3/283 60/737 |
| 2019/0113226 A1 | 4/2019 | Doerr et al. | |
| 2019/0170354 A1* | 6/2019 | Resvanis | F23R 3/16 |
| 2020/0025386 A1* | 1/2020 | Muldal | F23R 3/343 |
| 2020/0191394 A1* | 6/2020 | Tentorio | F23R 3/28 |
| 2020/0378603 A1* | 12/2020 | Tentorio | F23R 3/286 |
| 2022/0099290 A1* | 3/2022 | Stockill | F23D 11/383 |

OTHER PUBLICATIONS

Great Britain search report dated Dec. 5, 2024, issued in GB Patent Application No. 2405296.1.

\* cited by examiner

NOZZLE BODY FOR FUEL INJECTOR

CROSS-REFERENCE TO RELATED APPLICATIONS

This specification is based upon and claims the benefit of priority from United Kingdom patent application GB 2405296.1 filed on Apr. 15, 2024, the entire contents of which is incorporated herein by reference.

BACKGROUND

Technical Field

The present disclosure relates to a nozzle body for a fuel injector of a gas turbine engine and a method for supplying a fuel to a gas turbine engine.

Description of the Related Art

Gas turbine engines generally include one or more fuel injectors for directing fuel from a manifold to a combustor of the gas turbine engine. Fuel injectors prepare the fuel for mixing with air prior to combustion. Air-blast fuel injectors for dispensing atomized fuel into the combustor are also known in the art. Typically, in air-blast fuel injectors, a fuel stream is sandwiched in between inner and outer air streams resulting in faster fuel droplet as well as mixing. Current air-blast fuel injectors typically include three air streams. An aim of the outermost air stream is to guide an overall injector flow to produce a required cone angle. Currently, the outermost air stream is not fully utilised for mixing with the fuel, thereby producing higher level of smoke.

SUMMARY

According to a first aspect, there is provided a nozzle body for a fuel injector of a gas turbine engine. The nozzle body includes an inner air circuit extending along a central axis of the nozzle body and including an inner exit. The inner air circuit is configured to discharge an inner air through the inner exit. The nozzle body further includes an outer air circuit radially outward of the inner air circuit with respect to the central axis and including an outer exit. The outer air circuit is configured to discharge an outer air through the outer exit. The nozzle body further includes a fuel circuit radially disposed between the inner air circuit and the outer air circuit with respect to the central axis. The fuel circuit includes a fuel exit that is located proximal to the inner exit. The fuel circuit is configured to discharge a fuel through the fuel exit in a liquid state. The nozzle body further includes a dome air circuit radially outward of the outer air circuit with respect to the central axis and including a dome exit. The dome exit is configured to discharge a dome air through the dome exit. The nozzle body further includes a first prefilmer radially disposed between the outer air circuit and the dome air circuit with respect to the central axis. The first prefilmer has a hollow frustoconical configuration. The first prefilmer includes a radially inner surface facing the outer air circuit, a radially outer surface opposite to the radially inner surface and facing the dome air circuit, and a trailing edge extending between the radially inner surface and the radially outer surface and disposed at the outer exit. The first prefilmer is configured to separate the dome air and the outer air. The first prefilmer is inclined to the central axis by an inclination angle from 0 degree to 10 degrees, such that the fuel discharged from the fuel exit at least partially impinges on the radially inner surface of the first prefilmer. The nozzle body further includes a shroud disposed radially outward of the first prefilmer with respect to the central axis and at least partially defining the dome air circuit. The shroud includes a shroud throat that defines a minimum diameter of the shroud with respect to the central axis. The shroud throat is disposed downstream of the trailing edge of the first prefilmer. An axial gap between the shroud throat and the trailing edge of the first prefilmer along the central axis is between 1 mm and 2 mm, such that the fuel impinging on the radially inner surface of the first prefilmer is at least partially guided towards the dome air.

The first prefilmer of the nozzle body of the present disclosure is inclined to the central axis by the inclination angle from 0 degree to 10 degrees. This may allow the fuel discharged from the fuel exit to impinge on the radially inner surface of the first prefilmer. Specifically, at high power conditions, high swirling streams of the fuel impinges on the radially inner surface of the first prefilmer forming a thin, continuous fuel film across the radially inner surface while mixing with the outer air thoroughly. Additionally, the axial gap between the shroud throat and the trailing edge of the first prefilmer along the central axis is between 1 mm and 2 mm. After impinging on the radially inner surface of the first prefilmer, the fuel is subsequently sheared using the dome air. The dome air may entrain the fuel film formed across the radially inner surface of the first prefilmer and mix with the fuel, thereby reducing soot through efficient mixing of the fuel with the dome air. Thus, an extended length of the first prefilmer may enable rapid and proper mixing of the fuel with the dome air (i.e., an outermost air stream).

In some embodiments, the axial gap is 1.3 mm. This may enable generation of required flow acceleration for the dome air, which may entrain the fuel film and mix with the fuel, thereby reducing soot. Specifically, this may allow thorough mixing of the fuel with the dome air as well as generation of a wider cone of the fuel-air mixture exiting the nozzle body of the fuel injector.

In some embodiments, the inclination angle is 8.5 degrees. This may allow the fuel discharged from the fuel exit to impinge on the radially inner surface of the first prefilmer.

In some embodiments, the nozzle body further includes a second prefilmer at least partially defining the fuel circuit and forming a prefilmer lip disposed at the fuel exit. The second prefilmer is disposed radially inward of the first prefilmer with respect to central axis. The second prefilmer includes a radially outer cone surface facing the radially inner surface of the first prefilmer. The second prefilmer is disposed radially inward of the first prefilmer with respect to central axis, thereby allowing the fuel discharged from the fuel exit to impinge on the radially inner surface of the first prefilmer.

In some embodiments, a first axial distance is defined between the prefilmer lip and the trailing edge of the first prefilmer along the central axis. A second axial distance is defined between the prefilmer lip and the shroud throat along the central axis. The first axial distance is from 70% to 95% of the second axial distance. This may enable generation of required flow acceleration for the dome air which may entrain the fuel film and mix with the fuel, thereby reducing soot.

In some embodiments, the nozzle body further includes an inner air swirler disposed in the inner air circuit upstream of the inner exit. The inner air swirler may impart swirl to a compressor discharge air flowing therethrough.

In some embodiments, the nozzle body further includes an outer air swirler disposed in the outer air circuit upstream of the outer exit. The outer air swirler may impart swirl to the compressor discharge air flowing therethrough.

In some embodiments, the nozzle body further includes a dome air swirler disposed in the dome air circuit upstream of the dome exit. The dome air swirler may impart swirl to the compressor discharge air flowing therethrough.

According to a second aspect, there is provided a fuel injector including the nozzle body.

According to a third aspect, there is provided a method for supplying a fuel to a gas turbine engine. The method includes providing a nozzle body for a fuel injector. The nozzle body includes an inner air circuit extending along a central axis of the nozzle body and including an inner exit. The nozzle body further includes an outer air circuit radially outward of the inner air circuit with respect to the central axis and including an outer exit. The nozzle body further includes a fuel circuit radially disposed between the inner air circuit and the outer air circuit with respect to the central axis. The fuel circuit includes a fuel exit that is located proximal to the inner exit. The nozzle body further includes a dome air circuit radially outward of the outer air circuit with respect to the central axis and including a dome exit. The nozzle body further includes a first prefilmer radially disposed between the outer air circuit and the dome air circuit with respect to the central axis. The first prefilmer has a hollow frustoconical configuration. The first prefilmer includes a radially inner surface facing the outer air circuit, a radially outer surface opposite to the radially inner surface and facing the dome air circuit, and a trailing edge extending between the radially inner surface and the radially outer surface and disposed at the outer exit. The first prefilmer is inclined to the central axis by an inclination angle from 0 degree to 10 degrees. The nozzle body further includes a shroud disposed radially outward of the first prefilmer with respect to the central axis and at least partially defining the dome air circuit. The shroud includes a shroud throat that defines a minimum diameter of the shroud with respect to the central axis. The shroud throat is disposed downstream of the trailing edge of the first prefilmer. An axial gap between the shroud throat and the trailing edge of the first prefilmer along the central axis is between 1 mm and 2 mm. The method further includes receiving an inner air within the inner air circuit and discharging the inner air through the inner exit. The method further includes receiving an outer air within the outer air circuit and discharging the outer air through the outer exit. The method further includes receiving a dome air within the dome air circuit and discharging the dome air through the dome exit. The method further includes receiving the fuel within the fuel circuit and discharging the fuel through the fuel exit in a liquid state. The method further includes at least partially impinging the fuel discharged through the fuel exit on the radially inner surface of the first prefilmer. The method further includes at least partially guiding the fuel impinged on the radially inner surface of the first prefilmer towards the dome air exiting the dome exit.

In some embodiments, the axial gap is 1.3 mm.

In some embodiments, the inclination angle is 8.5 degrees.

In some embodiments, the nozzle body further includes a second prefilmer at least partially defining the fuel circuit and forming a prefilmer lip disposed at the fuel exit. The second prefilmer is disposed radially inward of the first prefilmer with respect to central axis. The second prefilmer includes a radially outer cone surface facing the radially inner surface of the first prefilmer.

In some embodiments, a first axial distance is defined between the prefilmer lip and the trailing edge of the first prefilmer along the central axis. A second axial distance is defined between the prefilmer lip and the shroud throat along the central axis. The first axial distance is from 70% to 95% of the second axial distance.

In some embodiments, the method further includes swirling, via an inner air swirler, the inner air prior to discharge from the inner exit.

In some embodiments, the method further includes swirling, via an outer air swirler, the outer air prior to discharge from the outer exit.

In some embodiments, the method further includes swirling, via a dome air swirler, the dome air prior to discharge from the dome exit.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
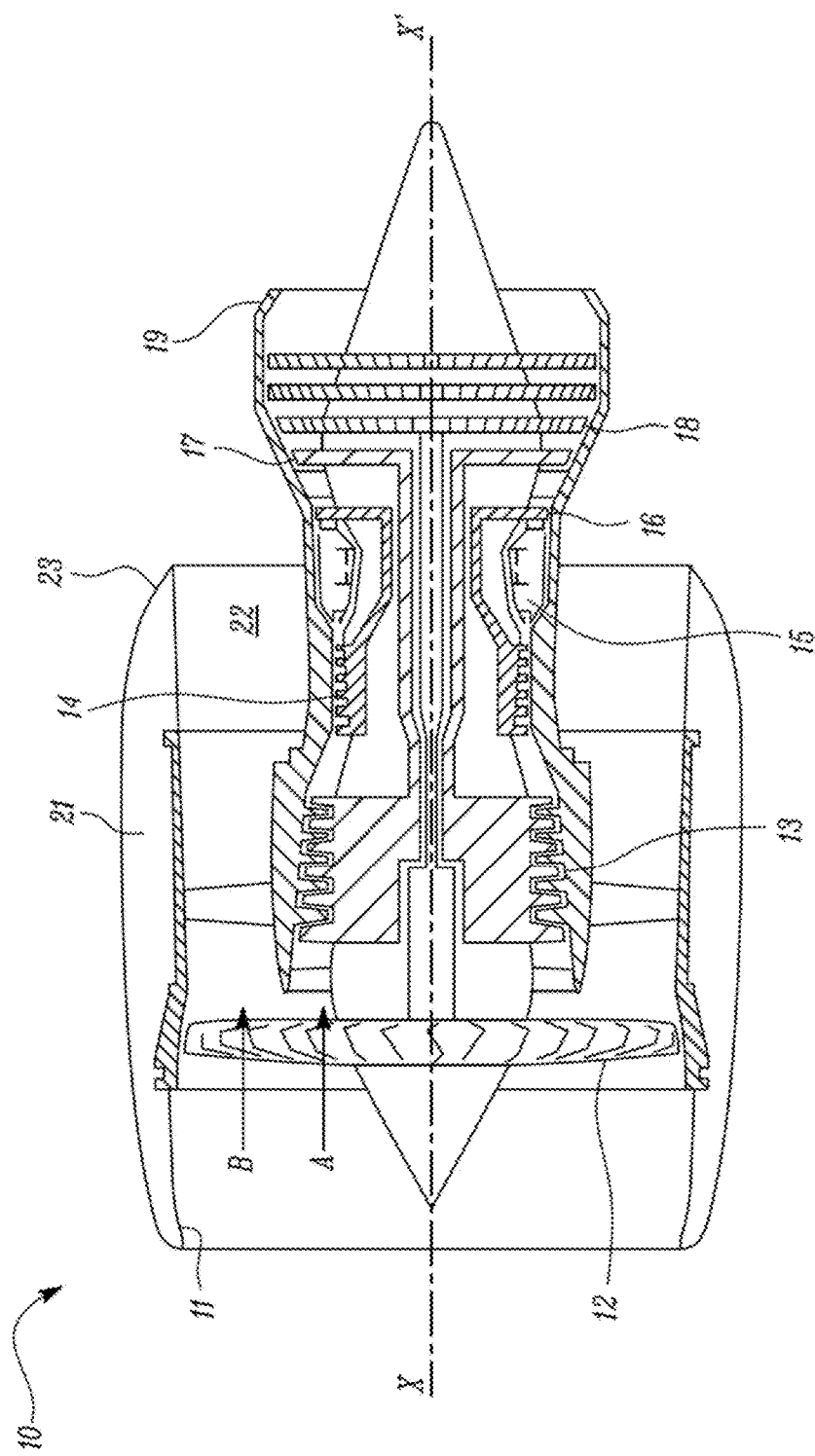
FIG. 1 is a schematic sectional side view of a gas turbine engine, according to an embodiment of the present disclosure.

FIG. 1 shows a schematic sectional side view of a gas turbine engine 10 having a principal rotational axis X-X'. The gas turbine engine 10 includes, in axial flow series, an air intake 11, a compressive fan 12 (which may also be referred to as a low pressure compressor), an intermediate pressure compressor 13, a high pressure compressor 14, combustion equipment 15, a high pressure turbine 16, an intermediate pressure turbine 17, a low pressure turbine 18, and a core exhaust nozzle 19. A nacelle 21 generally surrounds the gas turbine engine 10 and defines the air intake 11, a bypass duct 22, and a bypass exhaust nozzle 23.

The gas turbine engine 10 works in a conventional manner so that the air entering the air intake 11 is accelerated by the compressive fan 12 to produce two air flows: a first air flow A into the intermediate pressure compressor 13, and a second air flow B which passes through the bypass duct 22 to provide a propulsive thrust. The intermediate pressure compressor 13 compresses the first air flow A directed into it before delivering that air to the high pressure compressor 14 where further compression takes place.

The compressed air exhausted from the high pressure compressor 14 is directed into the combustion equipment 15 where it is mixed with fuel and the mixture is combusted. The resulting hot combustion products then expand through, and thereby drive the high, intermediate, and low pressure turbines 16, 17, 18 before being exhausted through the core exhaust nozzle 19 to provide additional propulsive thrust. The high, intermediate, and low pressure turbines 16, 17, 18 respectively drive the high and intermediate pressure compressors 14, 13, and the compressive fan 12 by suitable interconnecting shafts.

In some embodiments, the gas turbine engine 10 is used in an aircraft. In some embodiments, the gas turbine engine 10 is an ultra-high bypass ratio engine (UHBPR). In addition, the present invention is equally applicable to aero gas turbine engines, marine gas turbine engines, and land-based gas turbine engines.

Figure 2:
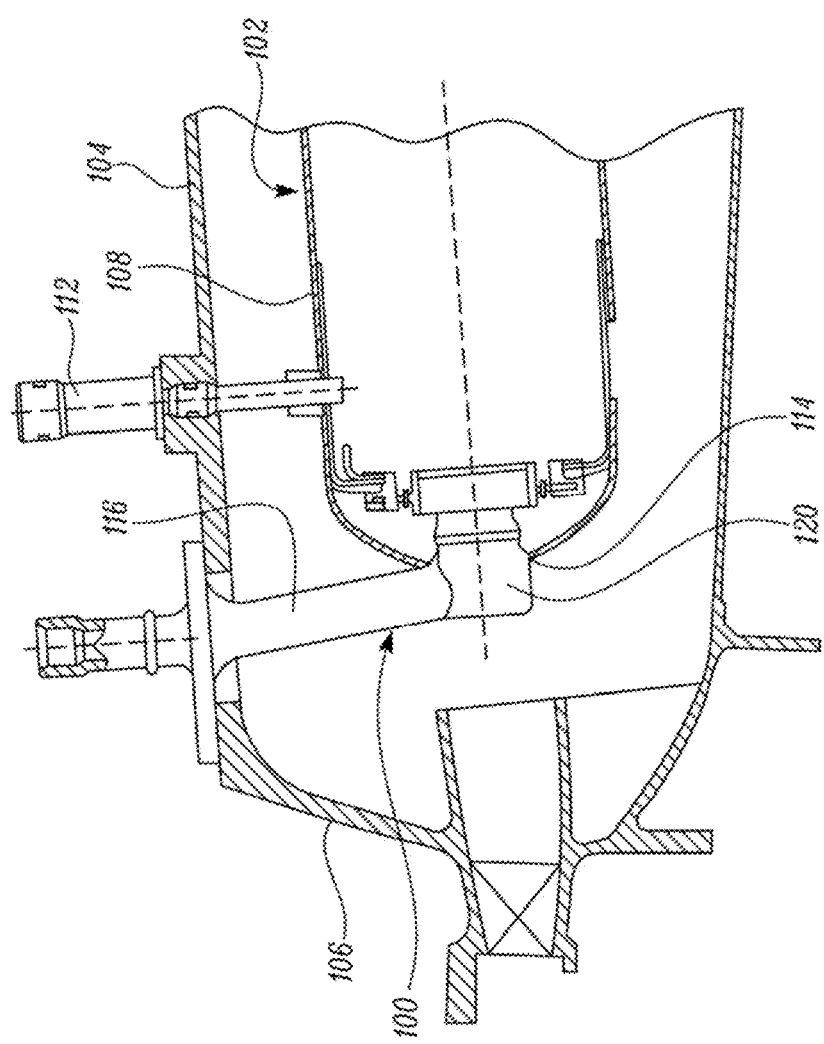
FIG. 2 is a schematic sectional side view of a portion of the gas turbine engine illustrating a fuel injector in communication with a combustor of the gas turbine engine, according to an embodiment of the present disclosure.

FIG. 2 is a schematic sectional side view of a portion of the gas turbine engine 10 (shown in FIG. 1) illustrating a fuel injector 100 in communication with a combustor 102. The fuel injector 100 and the combustor 102 may be a part of the combustion equipment 15 (shown in FIG. 1). In some embodiments, the gas turbine engine 10 further includes an outer casing 104 extending forwardly of an air diffuser 106. The outer casing 104 and the air diffuser 106 enclose the combustor 102 for containment of burning fuel. In some embodiments, the combustor 102 includes a combustor liner 108. An igniter 112 is mounted on the outer casing 104 and extends inwardly into the combustor liner 108 for igniting a fuel dispensed by the fuel injector 100. It should be understood that the above components can be conventional in the art and their manufacture and fabrication are well known.

In some embodiments, the fuel injector 100 is mounted on the outer casing 104 and extends inwardly through an aperture 114 in the combustor liner 108. In some embodiments, the gas turbine engine 10 may include multiple fuel injectors 100 mounted on the outer casing 104. In some embodiments, the fuel injector 100 receives the fuel, e.g., by connection to a fuel manifold or line (not shown). The fuel injector 100 includes a nozzle body 120 at least partially disposed within the combustor 102 for dispensing the fuel.

The nozzle body 120 receives the fuel via an injector stem 116 of the fuel injector 100. The injector stem 116 structurally supports the nozzle body 120 with respect to the outer casing 104. In some embodiments, the injector stem 116 has a thickness sufficient to support the nozzle body 120 in the combustor 102 when the fuel injector 100 is mounted to the outer casing 104. The injector stem 116 is formed of a material appropriate for engine applications. In some embodiments, the injector stem 116 includes a central bore (not shown) longitudinally extending along a length of the injector stem 116. One or more fuel conduits may extend through the central bore and fluidly interconnect the fuel manifold or line with the nozzle body 120.

Figure 3:
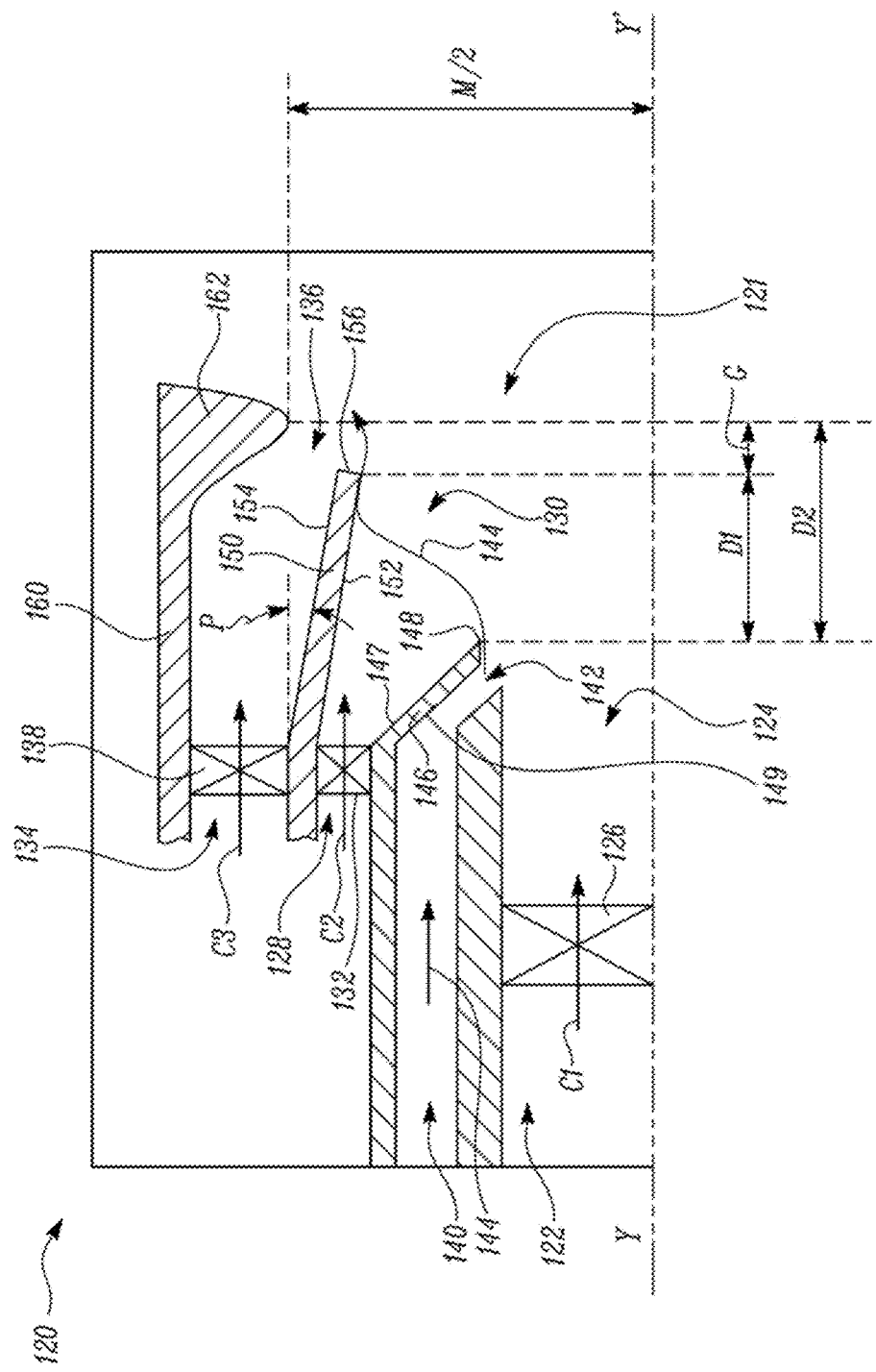
FIG. 3 is a schematic partial sectional side view of a nozzle body of the fuel injector, according to an embodiment of the present disclosure.

FIG. 3 is a schematic partial sectional side view of the nozzle body 120 of the fuel injector 100 (shown in FIG. 2). Specifically, FIG. 3 illustrates a downstream discharge end 121 of the nozzle body 120. The nozzle body 120 includes an inner air circuit 122 extending along a central axis Y-Y' of the nozzle body 120 and including an inner exit 124. The inner air circuit 122 is configured to discharge an inner air C1 through the inner exit 124. The inner air C1 may be a portion of a high pressure and high velocity air derived from the high pressure compressor 14 (shown in FIG. 1). As used herein, the terms "upstream" and "downstream" are with respect to a direction of air flowing through the nozzle body 120, e.g., the inner air C1.

In some embodiments, the nozzle body 120 further includes an inner air swirler 126 disposed in the inner air circuit 122 upstream of the inner exit 124. In some embodiments, the inner air swirler 126 may impart swirl to the inner air C1 flowing therethrough. In some embodiments, the inner air swirler 126 may include a series of circumferentially spaced vanes designed to direct the inner air C1 in a swirling manner. The vanes may be curved and oriented tangentially with respect to the central axis Y-Y' of the nozzle body 120 to promote swirling. A number, orientation, and location of the vanes may vary depending upon a desired air flow.

The nozzle body 120 further includes an outer air circuit 128 radially outward of the inner air circuit 122 with respect to the central axis Y-Y' and including an outer exit 130. The outer air circuit 128 is configured to discharge an outer air C2 through the outer exit 130. The outer air C2 may be a portion of the high pressure and high velocity air derived from the high pressure compressor 14. In some embodiments, the nozzle body 120 further includes an outer air swirler 132 disposed in the outer air circuit 128 upstream of the outer exit 130. In some embodiments, the outer air swirler 132 may impart swirl to the outer air C2 flowing therethrough. In some embodiments, the outer air swirler 132 may include a series of circumferentially spaced vanes designed to direct the outer air C2 in a swirling manner. The vanes may be curved and oriented tangentially with respect to the central axis Y-Y' of the nozzle body 120 to promote swirling. A number, orientation, and location of the vanes may vary depending upon a desired air flow.

The nozzle body 120 further includes a dome air circuit 134 radially outward of the outer air circuit 128 with respect to the central axis Y-Y' and including a dome exit 136. The dome exit 136 is configured to discharge a dome air C3 through the dome exit 136. The dome air C3 may be a portion of the high pressure and high velocity air derived from the high pressure compressor 14. In some embodiments, the nozzle body 120 further includes a dome air swirler 138 disposed in the dome air circuit 134 upstream of the dome exit 136. In some embodiments, the dome air swirler 138 may impart swirl to the dome air C3 flowing therethrough.

In some embodiments, the dome air swirler 138 may include a series of circumferentially spaced vanes designed to direct the dome air C3 in a swirling manner. The vanes may be curved and oriented tangentially with respect to the central axis Y-Y' of the nozzle body 120 to promote swirling. A number, orientation, and location of the vanes may vary depending upon a desired air flow. In some embodiments, the outer air circuit 128 and the dome air circuit 134 may be configured to provide the respective outer air C2 and the dome air C3 in a same rotational direction (co-rotating) or in an opposite rotational direction (counter-rotating). Further, in some embodiments, the respective vanes of the dome air swirler 138 and the outer air swirler 132 may be co-rotating or counter-rotating with respect to the vanes of the inner air swirler 126.

The inner air C1, the outer air C2, and the dome air C3 may form a portion of the high pressure and high velocity air derived from the high pressure compressor 14. A proportion of the air passing through the inner air circuit 122, the outer air circuit 128, and the dome air circuit 134 may vary based on application requirements.

The nozzle body 120 further includes a fuel circuit 140 radially disposed between the inner air circuit 122 and the outer air circuit 128 with respect to the central axis Y-Y'. The fuel circuit 140 includes a fuel exit 142 that is located proximal to the inner exit 124. The fuel circuit 140 is configured to discharge a fuel 144 through the fuel exit 142 in a liquid state. In some embodiments, the fuel circuit 140 may receive the fuel 144 from the injector stem 116 (shown in FIG. 2). In some embodiments, the fuel circuit 140 may further include fuel swirling arrangements (not shown) for imparting swirl to the fuel 144 flowing through the fuel circuit 140. For example, the fuel circuit 140 may deliver the fuel 144 in swirling motion through the fuel exit 142.

The nozzle body 120 further includes a first prefilmer 150 radially disposed between the outer air circuit 128 and the dome air circuit 134 with respect to the central axis Y-Y'. The first prefilmer 150 has a hollow frustoconical configuration. As used herein, the term "hollow" means that the first prefilmer 150 defines an internal space or volume, and is otherwise made of a solid material.

In some embodiments, the nozzle body 120 further includes a second prefilmer 146 at least partially defining the fuel circuit 140 and forming a prefilmer lip 148 disposed at the fuel exit 142. The prefilmer lip 148 is disposed at a downstream edge of the fuel circuit 140. Specifically, the prefilmer lip 148 may be in the form of an annular ring disposed at the downstream edge of the second prefilmer 146.

The second prefilmer 146 is inclined inwardly with respect to the central axis Y-Y'. The second prefilmer 146 may receive the fuel 144 and may direct the fuel 144 in a swirling manner from the fuel exit 142 toward the central axis Y-Y'. In some embodiments, the second prefilmer 146 may function as a prefilmer for the fuel 144. Specifically, the second prefilmer 146 may assist the fuel 144 in forming a thin, continuous fuel sheet across a radially inner cone surface 149 of the second prefilmer 146, and in accelerating the fuel 144 as the fuel 144 passes downstream along the radially inner cone surface 149 and shed at the prefilmer lip 148.

As used herein, the terms "inner air circuit 122" and "outer air circuit 128" are relative to the fuel sheet that is formed on the radially inner cone surface 149 of the second prefilmer 146. In the illustrated embodiment, the outer air circuit 128 (which is radially outward of the second prefilmer 146) is surrounded by an outermost air circuit, i.e., the dome air circuit 134.

In some conventional gas turbine engines where fuel injectors typically include three air streams, i.e., the inner air circuit, the outer air circuit, and the dome air circuit (or the outermost air circuit), the dome air circuit may be an integral part of a combustor dome (e.g., metering panel, heatshield, etc.). In such cases, a fuel injector with an inner air circuit and an outer air circuit may be inserted through the dome air circuit. However, in the illustrated embodiments, the dome air circuit 134 is an integral part of the nozzle body 120 of the fuel injector 100 (shown in FIG. 2).

The fuel 144 dispensed from the second prefilmer 146 at the fuel exit 142 also preferably interacts with inner air C1 discharged by the inner air circuit 122. In the illustrated embodiment, the inner air swirler 126 is positioned upstream of the prefilmer lip 148 of the second prefilmer 146. The inner air swirler 126 may direct the inner air C1 in the swirling manner upstream of the fuel exit 142 and toward the discharge end 121 of the nozzle body 120. Additionally, the second prefilmer 146 is disposed radially inwardly and upstream of the outer exit 130 of the outer air circuit 128, such that the outer air swirler 132 directs the outer air C2 with a radially inwardly swirling component of motion downstream of the fuel 144 being dispensed from the fuel exit 142.

In some embodiments, the inner air C1 from the inner air swirler 126 passes inwardly of the fuel 144 to form a swirling, central air flow to aid atomization of the fuel 144 downstream from the second prefilmer 146. Further, as the fuel 144 is released from the prefilmer lip 148 of the second prefilmer 146, the fuel sheet is impacted by the outer air C2 from the outer air swirler 132. As a result, the fuel sheet is quickly atomized into a fine dispersion and is evenly distributed in a conical spray. This enables the nozzle body 120 to provide good spray performance and improved spray uniformity with essentially no streaks, voids, or non-homogeneities.

The first prefilmer 150 includes a radially inner surface 152 facing the outer air circuit 128, a radially outer surface 154 opposite to the radially inner surface 152 and facing the dome air circuit 134, and a trailing edge 156 extending between the radially inner surface 152 and the radially outer surface 154 and disposed at the outer exit 130. In some embodiments, the radially inner surface 152 and the radially outer surface 154 may taper towards each other.

The first prefilmer 150 is configured to separate the dome air C3 and the outer air C2. The first prefilmer 150 is inclined to the central axis Y-Y' by an inclination angle P from 0 degree to 10 degrees, such that the fuel 144 discharged from the fuel exit 142 at least partially impinges on the radially inner surface 152 of the first prefilmer 150. Specifically, the inclination angle P of the first prefilmer 150 may allow the fuel 144 discharged from the fuel exit 142 to impinge on the radially inner surface 152 of the first prefilmer 150. More specifically, at high power conditions, high swirling streams of the fuel 144 impinges on the radially inner surface 152 of the first prefilmer 150 forming a thin, continuous fuel film across the radially inner surface 152 while mixing with the outer air C2 thoroughly.

In some embodiments, the inclination angle is between 1 degree and 10 degrees, or between 2 degrees and 10 degrees, or between 3 degrees and 10 degrees, or between 4 degrees and 10 degrees, or between 5 degrees and 10 degrees, or between 6 degrees and 10 degrees, or between 7 degrees and 10 degrees, or between 8 degrees and 10 degrees, or between 9 degrees and 10 degrees. In some embodiments, the inclination angle is 8.5 degrees.

The nozzle body 120 further includes a shroud 160 disposed radially outward of the first prefilmer 150 with respect to the central axis Y-Y' and at least partially defining the dome air circuit 134. The shroud 160 includes a shroud throat 162 (i.e., an annular bulbous portion) that defines a minimum diameter M (a radius M/2 shown in FIG. 3) of the shroud 160 with respect to the central axis Y-Y'. The shroud throat 162 is disposed downstream of the trailing edge 156 of the first prefilmer 150. In some embodiments, the shroud throat 162 may provide good spray patternation and adequate droplet dispersion. The outer air circuit 128 may provide a more focused air flow than the dome air circuit 134.

An axial gap G between the shroud throat 162 and the trailing edge 156 of the first prefilmer 150 along the central axis Y-Y' is between 1 mm and 2 mm, such that the fuel 144 impinging on the radially inner surface 152 of the first prefilmer 150 is at least partially guided towards the dome air C3. Specifically, after impinging on the radially inner surface 152 of the first prefilmer 150, the fuel 144 is subsequently sheared using the dome air C3. The axial gap G may enable generation of required flow acceleration for the dome air C3, which may entrain the fuel film formed across the radially inner surface 152 of the first prefilmer 150 and mix with the fuel 144, thereby reducing soot through efficient mixing of the fuel 144 with the dome air C3. Thus, an extended length of the first prefilmer 150 may enable rapid and proper mixing of the fuel 144 with the dome air C3. The axial gap G may allow thorough mixing of the fuel 144 with the dome air C3 as well as generation of a wider cone of the fuel-air mixture exiting the nozzle body 120.

In some embodiments, the axial gap G is between 1.1 mm and 2 mm, or between 1.2 mm and 2 mm, or between 1.3 mm and 2 mm, or between 1.4 mm and 2 mm, or between 1.5 mm and 2 mm, or between 1.6 mm and 2 mm, or between 1.7 mm and 2 mm, or between 1.8 mm and 2 mm, or between 1.9 mm and 2 mm. In some embodiments, the axial gap G is 1.3 mm.

In some embodiments, the second prefilmer 146 is disposed radially inward of the first prefilmer 150 with respect to central axis Y-Y'. This may allow the fuel 144 discharged from the fuel exit 142 to impinge on the radially inner surface 152 of the first prefilmer 150. The second prefilmer 146 further includes a radially outer cone surface 147 opposite to the radially inner cone surface 149 and facing the radially inner surface 152 of the first prefilmer 150.

In some embodiments, a first axial distance D1 is defined between the prefilmer lip 148 and the trailing edge 156 of the first prefilmer 150 along the central axis Y-Y'. A second axial distance D2 is defined between the prefilmer lip 148 and the shroud throat 162 along the central axis Y-Y'. The first axial distance D1 is from 70% to 95% of the second axial distance D2. This may enable generation of required flow acceleration for the dome air C3, which may entrain the fuel film formed across the radially inner surface 152 of the first prefilmer 150 and mix with the fuel 144, thereby reducing soot.

Figure 4:
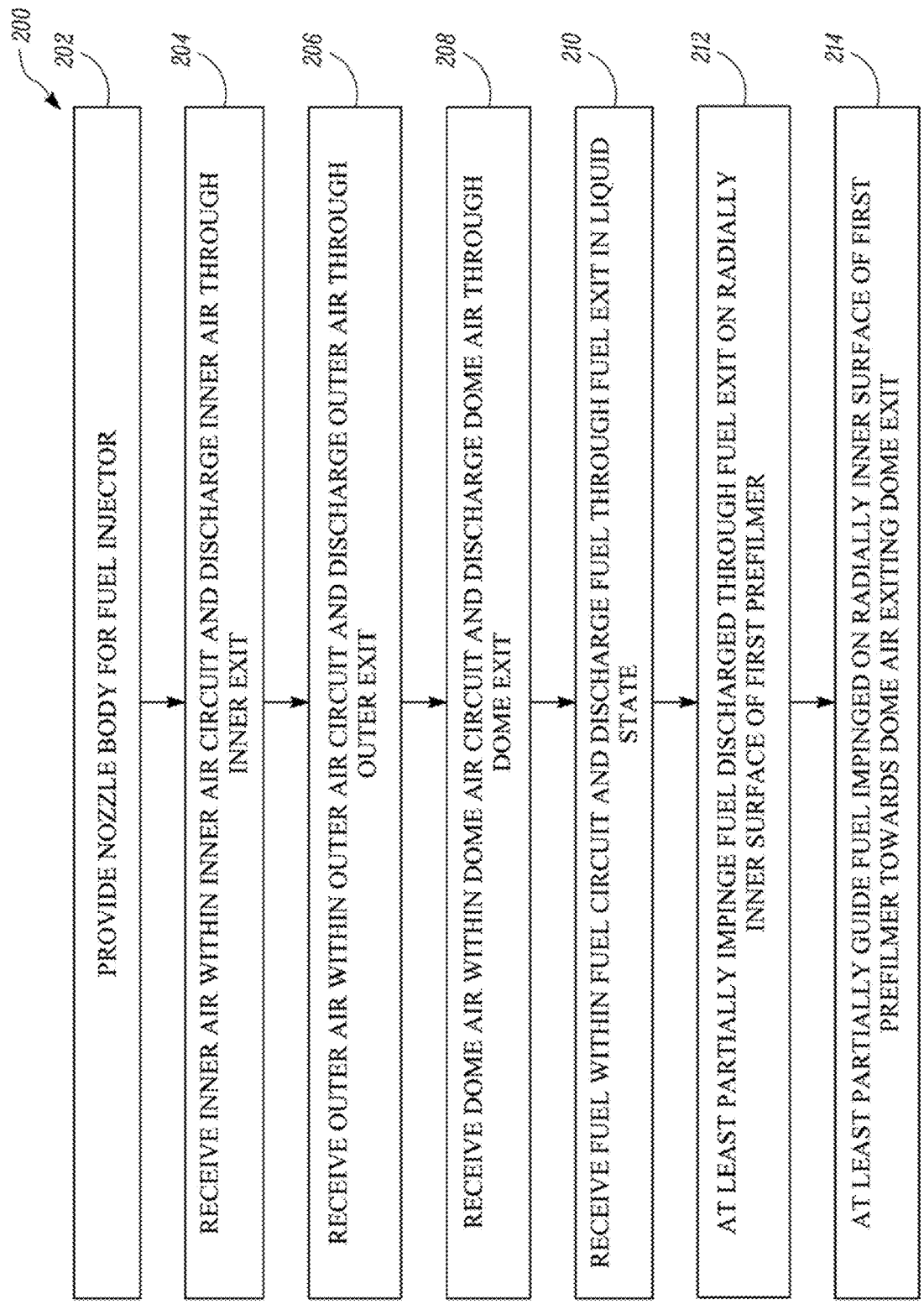
FIG. 4 is a flowchart illustrating a method for supplying a fuel to the gas turbine engine, according to an embodiment of the present disclosure.

FIG. 4 is a flow chart illustrating a method 200 for supplying the fuel 144 to the gas turbine engine 10. The method 200 will be described hereinafter with reference to the gas turbine engine shown in FIG. 1, the fuel injector 100 shown in FIG. 2, and the nozzle body 120 shown in FIGS. 2 and 3. At step 202, the method 200 includes providing the nozzle body 120 for the fuel injector 100.

The nozzle body 120 includes the inner air circuit 122 extending along the central axis Y-Y' of the nozzle body 120 and including the inner exit 124. The nozzle body 120 further includes the outer air circuit 128 radially outward of the inner air circuit 122 with respect to the central axis Y-Y' and including the outer exit 130. The nozzle body 120 further includes the fuel circuit 140 radially disposed between the inner air circuit 122 and the outer air circuit 128 with respect to the central axis Y-Y'. The fuel circuit 140 includes the fuel exit 142 that is located proximal to the inner exit 124. The nozzle body 120 further includes the dome air circuit 134 radially outward of the outer air circuit 128 with respect to the central axis Y-Y' and including the dome exit 136.

The nozzle body 120 further includes the first prefilmer 150 radially disposed between the outer air circuit 128 and the dome air circuit 134 with respect to the central axis Y-Y'. The first prefilmer 150 has a hollow configuration. The first prefilmer 150 includes the radially inner surface 152 facing the outer air circuit 128, the radially outer surface 154 opposite to the radially inner surface 152 and facing the dome air circuit 134, and the trailing edge 156 extending between the radially inner surface 152 and the radially outer surface 154 and disposed at the outer exit 130. The first prefilmer 150 is inclined to the central axis Y-Y' by the inclination angle P from 0 degree to 10 degrees. In some embodiments, the inclination angle is 8.5 degrees.

The nozzle body 120 further includes the shroud 160 disposed radially outward of the first prefilmer 150 with respect to the central axis Y-Y' and at least partially defining the dome air circuit 134. The shroud 160 includes the shroud throat 162 that defines the minimum diameter M of the shroud 160 with respect to the central axis Y-Y'. The shroud throat 162 is disposed downstream of the trailing edge 156 of the first prefilmer 150. The axial gap G between the shroud throat 162 and the trailing edge 156 of the first prefilmer 150 along the central axis Y-Y' is between 1 mm and 2 mm. In some embodiments, the axial gap G is 1.3 mm.

In some embodiments, the nozzle body 120 further includes the second prefilmer 146 at least partially defining the fuel circuit 140 and forming the prefilmer lip 148 disposed at the fuel exit 142. The second prefilmer 146 is disposed radially inward of the first prefilmer 150 with respect to central axis Y-Y'. The second prefilmer 146 includes the radially outer cone surface 147 facing the radially inner surface 152 of the first prefilmer 150. In some embodiments, the first axial distance D1 is defined between the prefilmer lip 148 and the trailing edge 156 of the first prefilmer 150 along the central axis Y-Y'. The second axial distance D2 is defined between the prefilmer lip 148 and the shroud throat 162 along the central axis Y-Y'. The first axial distance D1 is from 70% to 95% of the second axial distance D2.

At step 204, the method 200 further includes receiving the inner air C1 within the inner air circuit 122 and discharging the inner air C1 through the inner exit 124. In some embodiments, the method 200 further includes swirling, via the inner air swirler 126, the inner air C1 prior to discharge from the inner exit 124.

At step 206, the method 200 further includes receiving the outer air C2 within the outer air circuit 128 and discharging the outer air C2 through the outer exit 130. In some embodiments, the method 200 further includes swirling, via the outer air swirler 132, the outer air C2 prior to discharge from the outer exit 130.

At step 208, the method 200 further includes receiving the dome air C3 within the dome air circuit 134 and discharging the dome air C3 through the dome exit 136. In some embodiments, the method 200 further includes swirling, via the dome air swirler 138, the dome air C3 prior to discharge from the dome exit 136.

At step 210, the method 200 further includes receiving the fuel 144 within the fuel circuit 140 and discharging the fuel 144 through the fuel exit 142 in a liquid state.

At step 212, the method 200 further includes at least partially impinging the fuel 144 discharged through the fuel exit 142 on the radially inner surface 152 of the first prefilmer 150.

At step 214, the method 200 further includes at least partially guiding the fuel 144 impinged on the radially inner surface 152 of the first prefilmer 150 towards the dome air C3 exiting the dome exit 136.

Referring to FIGS. 1-4, the first prefilmer 150 of the nozzle body 120 of the present disclosure is inclined to the central axis Y-Y' by the inclination angle P from 0 degree to 10 degrees. This may allow the fuel 144 discharged from the fuel exit 142 to impinge on the radially inner surface 152 of the first prefilmer 150. Specifically, at high power conditions, high swirling streams of the fuel 144 impinges on the radially inner surface 152 of the first prefilmer 150 forming a thin, continuous fuel film across the radially inner surface 152 while mixing with the outer air C2 thoroughly.

Additionally, the axial gap G between the shroud throat 162 and the trailing edge 156 of the first prefilmer 150 along the central axis Y-Y' is between 1 mm and 2 mm. The axial gap G may enable generation of required flow acceleration for the dome air C3. After impinging on the radially inner surface 152 of the first prefilmer 150, the fuel 144 is subsequently sheared using the dome air C3. Specifically, the dome air C3 may entrain the fuel film formed across the radially inner surface 152 of the first prefilmer 150 and mix with the fuel 144, thereby reducing soot through efficient mixing of the fuel 144 with the dome air C3. This may allow thorough mixing of the fuel 144 with the dome air C3 as well as generation of a wider cone of the fuel-air mixture exiting the nozzle body 120 of the fuel injector 100. Thus, an extended length of the first prefilmer 150 may enable rapid and proper mixing of the fuel 144 with the dome air C3.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A nozzle body for a fuel injector of a gas turbine engine, the nozzle body comprising:
    an inner air circuit extending along a central axis of the nozzle body and comprising an inner exit, wherein the inner air circuit is configured to discharge an inner air through the inner exit;
    an outer air circuit radially outward of the inner air circuit with respect to the central axis and comprising an outer exit, wherein the outer air circuit is configured to discharge an outer air through the outer exit;
    a fuel circuit radially disposed between the inner air circuit and the outer air circuit with respect to the central axis, the fuel circuit comprising a fuel exit that is located proximal to the inner exit, wherein the fuel circuit is configured to discharge a fuel through the fuel exit in a liquid state;
    a dome air circuit radially outward of the outer air circuit with respect to the central axis and comprising a dome exit, wherein the dome exit is configured to discharge a dome air through the dome exit;
    a first prefilmer radially disposed between the outer air circuit and the dome air circuit with respect to the central axis, the first prefilmer having a hollow frusto-conical configuration, the first prefilmer comprising a radially inner surface facing the outer air circuit, a radially outer surface opposite to the radially inner surface and facing the dome air circuit, and a trailing edge extending between the radially inner surface and the radially outer surface and disposed at the outer exit, wherein the first prefilmer is configured to separate the dome air and the outer air, and wherein the first prefilmer is inclined to the central axis by an inclination angle from 0 degree to 10 degrees, such that the fuel discharged from the fuel exit at least partially impinges on the radially inner surface of the first prefilmer; and
    a shroud disposed radially outward of the first prefilmer with respect to the central axis and at least partially defining the dome air circuit, the shroud comprising a shroud throat that defines a minimum diameter of the shroud with respect to the central axis;
    wherein the shroud throat is disposed downstream of the trailing edge of the first prefilmer, and wherein an axial gap between the shroud throat and the trailing edge of the first prefilmer along the central axis is between 1 mm and 2 mm, such that the fuel impinging on the radially inner surface of the first prefilmer is at least partially guided towards the dome air.

2. The nozzle body of claim 1, wherein the axial gap is 1.3 mm.

3. The nozzle body of claim 1, wherein the inclination angle is 8.5 degrees.

4. The nozzle body of claim 1, further comprising a second prefilmer at least partially defining the fuel circuit and forming a prefilmer lip disposed at the fuel exit, wherein the second prefilmer is disposed radially inward of the first prefilmer with respect to central axis, the second prefilmer comprising a radially outer cone surface facing the radially inner surface of the first prefilmer.

5. The nozzle body of claim 4, wherein a first axial distance is defined between the prefilmer lip and the trailing edge of the first prefilmer along the central axis, wherein a second axial distance is defined between the prefilmer lip and the shroud throat along the central axis, and wherein the first axial distance is from 70% to 95% of the second axial distance.

6. The nozzle body of claim 1, further comprising an inner air swirler disposed in the inner air circuit upstream of the inner exit.

7. The nozzle body of claim 1, further comprising an outer air swirler disposed in the outer air circuit upstream of the outer exit.

8. The nozzle body of claim 1, further comprising a dome air swirler disposed in the dome air circuit upstream of the dome exit.

9. A fuel injector including the nozzle body of claim 1.

10. A method for supplying a fuel to a gas turbine engine, the method comprising:
    providing a nozzle body for a fuel injector, the nozzle body comprising:
        an inner air circuit extending along a central axis of the nozzle body and comprising an inner exit;
        an outer air circuit radially outward of the inner air circuit with respect to the central axis and comprising an outer exit;
        a fuel circuit radially disposed between the inner air circuit and the outer air circuit with respect to the central axis, the fuel circuit comprising a fuel exit that is located proximal to the inner exit;
        a dome air circuit radially outward of the outer air circuit with respect to the central axis and comprising a dome exit;
        a first prefilmer radially disposed between the outer air circuit and the dome air circuit with respect to the central axis, the first prefilmer having a hollow frustoconical configuration, the first prefilmer comprising a radially inner surface facing the outer air circuit, a radially outer surface opposite to the radially inner surface and facing the dome air circuit, and a trailing edge extending between the radially inner surface and the radially outer surface and disposed at the outer exit, wherein the first prefilmer is inclined to the central axis by an inclination angle from 0 degree to 10 degrees; and
        a shroud disposed radially outward of the first prefilmer with respect to the central axis and at least partially defining the dome air circuit, the shroud comprising a shroud throat that defines a minimum diameter of the shroud with respect to the central axis, wherein the shroud throat is disposed downstream of the trailing edge of the first prefilmer, and wherein an axial gap between the shroud throat and the trailing edge of the first prefilmer along the central axis is between 1 mm and 2 mm;

receiving an inner air within the inner air circuit and discharging the inner air through the inner exit;

receiving an outer air within the outer air circuit and discharging the outer air through the outer exit;

receiving a dome air within the dome air circuit and discharging the dome air through the dome exit;

receiving the fuel within the fuel circuit and discharging the fuel through the fuel exit in a liquid state;

at least partially impinging the fuel discharged through the fuel exit on the radially inner surface of the first prefilmer; and at least partially guiding the fuel impinged on the radially inner surface of the first prefilmer towards the dome air exiting the dome exit.

11. The method of claim 10, wherein the axial gap (G) is 1.3 mm.

12. The method of claim 10, wherein the inclination angle is 8.5 degrees.

13. The method of claim 10, wherein the nozzle body further comprises a second prefilmer at least partially defining the fuel circuit and forming a prefilmer lip disposed at the fuel exit, wherein the second prefilmer is disposed radially inward of the first prefilmer with respect to central axis, and wherein the second prefilmer comprises a radially outer cone surface facing the radially inner surface of the first prefilmer.

14. The method of claim 10, wherein a first axial distance is defined between the prefilmer lip and the trailing edge of the first prefilmer along the central axis, wherein a second axial distance is defined between the prefilmer lip and the shroud throat along the central axis, and wherein the first axial distance is from 70% to 95% of the second axial distance.

15. The method of claim 10, further comprising swirling, via an inner air swirler, the inner air prior to discharge from the inner exit.

16. The method of claim 10, further comprising swirling, via an outer air swirler, the outer air prior to discharge from the outer exit.

17. The method of claim 10, further comprising swirling, via a dome air swirler, the dome air prior to discharge from the dome exit.

* * * * *